United States Patent
Henry et al.

(10) Patent No.: US 9,473,373 B2
(45) Date of Patent: Oct. 18, 2016

(54) METHOD AND SYSTEM FOR STORING PACKET FLOWS

(71) Applicant: JDS Uniphase Corporation, Milpitas, CA (US)

(72) Inventors: Thomas Henry, Colorado Springs, CO (US); Scott A. Blomquist, Colorado Springs, CO (US)

(73) Assignee: Viavi Solutions, Inc., Milpitas, CA (US)

( * ) Notice: Subject to any disclaimer, the term of this patent is extended or adjusted under 35 U.S.C. 154(b) by 249 days.

(21) Appl. No.: 13/857,012

(22) Filed: Apr. 4, 2013

(65) Prior Publication Data

US 2013/0265883 A1 Oct. 10, 2013

Related U.S. Application Data

(60) Provisional application No. 61/620,291, filed on Apr. 4, 2012, provisional application No. 61/620,344, filed on Apr. 4, 2012, provisional application No. 61/622,187, filed on Apr. 10, 2012.

(51) Int. Cl.
*H04L 12/26* (2006.01)

(52) U.S. Cl.
CPC ......... *H04L 43/0876* (2013.01); *H04L 43/028* (2013.01); *H04L 43/04* (2013.01)

(58) Field of Classification Search
CPC ................................. H04L 43/04; H04W 4/02
See application file for complete search history.

(56) References Cited

U.S. PATENT DOCUMENTS

| | | | |
|---|---|---|---|
| 5,708,659 A | 1/1998 | Rostoker et al. | 370/392 |
| 5,757,795 A | 5/1998 | Schnell | 370/392 |
| 6,266,705 B1 | 7/2001 | Ullum et al. | 709/238 |
| 6,308,172 B1 | 10/2001 | Agrawal et al. | |
| 6,457,058 B1 | 9/2002 | Ullum et al. | 709/238 |
| 6,731,633 B1 | 5/2004 | Sohor et al. | 370/392 |
| 7,085,271 B2 | 8/2006 | Gooch | 370/392 |
| 7,203,768 B2 | 4/2007 | Olsen | 709/249 |
| 7,499,446 B1 | 3/2009 | Gou et al. | 370/389 |
| 7,778,194 B1 * | 8/2010 | Yung | 370/252 |
| 7,852,850 B2 | 12/2010 | Kopelman et al. | 370/395.32 |
| 7,990,973 B2 | 8/2011 | Hao et al. | 370/392 |
| 8,423,594 B2 | 4/2013 | Fulton et al. | 711/216 |
| 2008/0256029 A1 | 10/2008 | Abrink | |
| 2009/0141638 A1 * | 6/2009 | Dolisy | 370/241 |
| 2009/0274154 A1 | 11/2009 | Kopelman et al. | 370/395.32 |
| 2011/0161657 A1 | 6/2011 | So | 713/153 |
| 2011/0206064 A1 * | 8/2011 | Head et al. | 370/474 |
| 2012/0143877 A1 | 6/2012 | Kumar et al. | 707/747 |
| 2012/0147892 A1 | 6/2012 | Basso et al. | 370/392 |
| 2012/0170584 A1 | 7/2012 | Christophersen | 370/392 |

FOREIGN PATENT DOCUMENTS

EP 0675451 10/1995

* cited by examiner

*Primary Examiner* — Andrew Lai
*Assistant Examiner* — Jamaal Henson
(74) *Attorney, Agent, or Firm* — Harrity & Harrity, LLP

(57) ABSTRACT

A method for storing a plurality of packets includes receiving a packets from a network, applying a hash function to values of one or more fields in the packet so as define a hash key and to select a storage bucket from a plurality of buckets, and adding the packet to the storage bucket. A bucket record associated with the storage bucket includes a flow index determined based on the values of the one or more fields in the packet.

6 Claims, 9 Drawing Sheets

Strict time ordering

Loose time ordering

METHOD AND SYSTEM FOR STORING PACKET FLOWS

CROSS-REFERENCE TO RELATED APPLICATIONS

The present application claims priority from U.S. Provisional Patent Applications Nos. 61/620,291 and 61/620,344 filed Apr. 4, 2012, and U.S. Provisional Patent Application No. 61/622,187 filed Apr. 10, 2012; the three applications are incorporated herein by reference.

TECHNICAL FIELD

The present invention relates generally to networking and communications technology and, more particularly, to methods and systems for network monitoring.

BACKGROUND OF THE INVENTION

Communication networks are widely used today; the variety of networks includes the Internet, wide-area networks (WANs), local-area networks (LANs), telephony networks, and wireless networks. The networks operate by sending small blocks of bytes in the form of packets which can range in size from 64 bytes up to over 1.5 thousand bytes. Often a plurality of ordered packets are required to communicate a message or data. A variety of protocols allow sequences of packets to be chained together into extended messages and/or data feeds; such flows can be separated from other messages and data feeds.

The importance of network monitoring and testing is growing as well as the requirements for related methods and equipment. Monitoring devices may be implemented within a network for monitoring communications along the network. The monitoring devices are referred to as "eavesdropping devices" or "passive probes" because they are generally not a party to the communication but are instead monitoring such communication for some reason, such as for performance monitoring of the network, or testing.

A network monitoring system may include a packet store, a specific node in the network which stores at least some of the packets that pass through the network. This approach allows data mining at a later date using a packet analyzing tool. In conventional storage systems, packets are stored in the order they are received. When a user requests a specific flow, the bulk of the stored packets are searched for the packets that belong to the requested flow. This is inefficient because the user has to deal with massive amounts of extraneous and irrelevant data and each packet in the store is individually evaluated whether it belongs to the flow of interest. Furthermore, there is no a priori way to verify the existence of a specific flow. Instead, the information store must be searched to determine the existence of the flow, which can take hours.

Accordingly, there is a need for a method for storing packets which enables easy retrieval of packets which belong to a desired flow, and for a system which implements the storing and retrieval methods.

SUMMARY OF THE INVENTION

According to one aspect of the invention, a method for storing a plurality of packets includes receiving a packet from a network, applying a hash function to values of one or more fields in the packet so as define a hash key and thus to select a storage bucket from a plurality of buckets, and adding the packet to the storage bucket; wherein a bucket record associated with the storage bucket includes a flow index determined based on the values of the one or more fields in the packet.

A method for retrieval of a packet flow stored using the above method wherein the packet flow comprises packets having the values in the one or more fields, includes: obtaining the values of one or more fields, selecting a bucket from a plurality of buckets by hashing the values of the one or more parameters, determining whether a bucket record contains a flow associated with the one or more parameters, and if the bucket contains the flow associated with the one or more parameters, providing the packet flow from the bucket.

A method for retrieval of a packet flow from a tangible memory includes obtaining one or more parameters of the packet flow, selecting a bucket from a plurality of buckets by hashing the one or more parameters, if the bucket contains a flow associated with the one or more parameters, providing the flow from the bucket.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
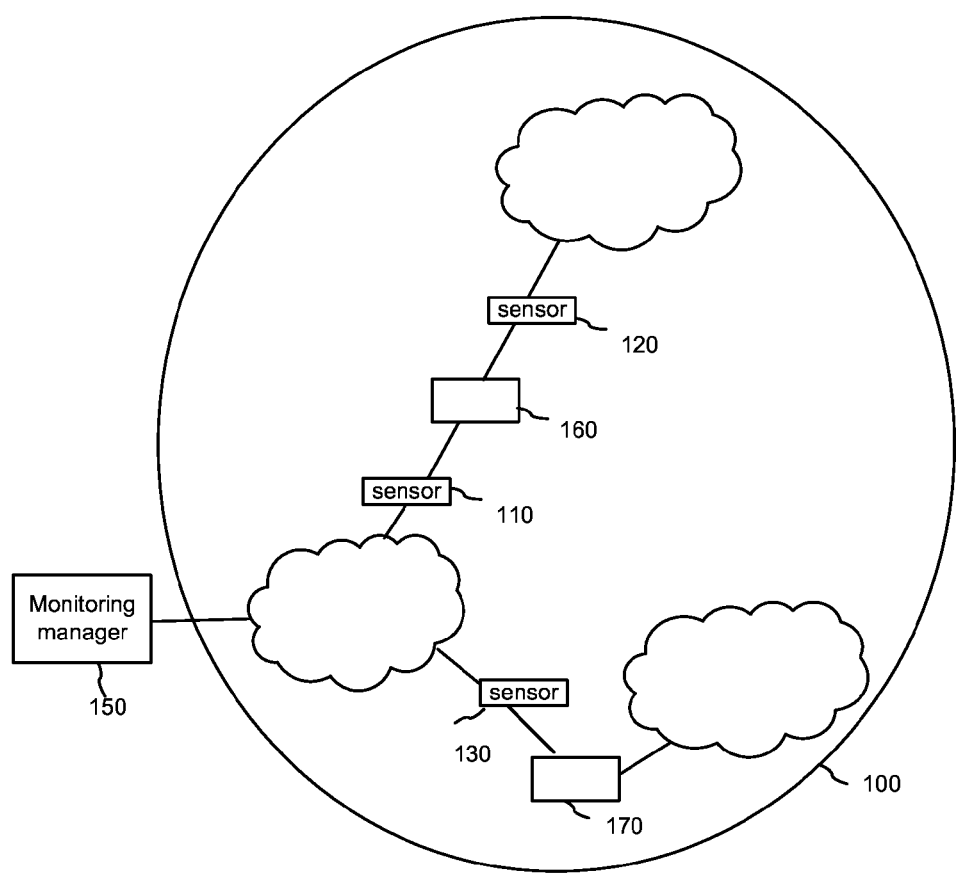
FIG. 1 is a schematic diagram of a test system.

A plurality of devices may be disposed in a network for monitoring communication along the network. Monitoring sensors may be attached directly to a port or passive network tap at a switch or element; the devices are generally referred to as sensors or probes. With reference to FIG. 1, a plurality of sensors including sensors 110, 120, and 130 are provided for monitoring a network 100 which includes nodes 160 and 170. Together with a monitoring manager 150, the sensors form a network monitoring system.

The communication network 100 may be any type of packet network, currently known or later developed, including the Internet, WAN, LAN, Multi-label Packet Switching (MPLS) networks, telephony networks, wireless networks, optical networks, and any combination of the foregoing. Preferably, the communication network 100 is a packet-switched network or any type of network that uses addressing for packet, cell or frame delivery. Such networks include, but are not limited to, Asynchronous Transfer Mode (ATM) networks, Frame Relay networks, Hybrid fiber-coaxial (HFC) networks, and Synchronous Optical Network/Synchronous Digital Hierarchy (SONET/SDH) networks. The current design is for packet based networks, but the invention could be useful in other kinds of networks.

Accordingly, the term "packet" should be understood as including conventional packets, such as IP and Ethernet packets, as well as cells and frames.

Figure 2:
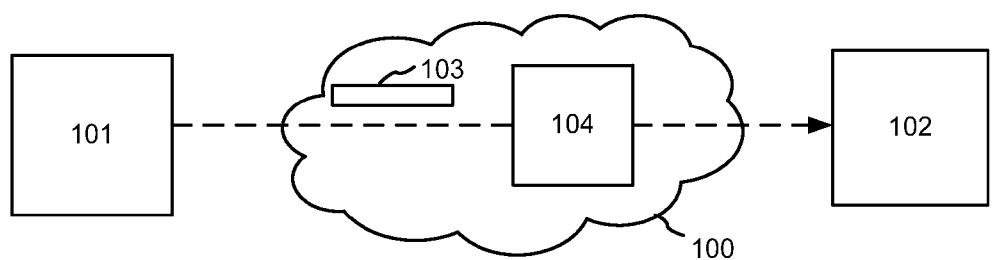
FIG. 2 is a schematic diagram of a test device connected inline in a network.

With reference to FIG. 2, a test device (sensor) 104, which represents the sensors shown in FIG. 1, is connected inline in the network 100 so that packets passing between at least two devices on the network, in this case between a data source device 101 and a destination device 102, pass through the test device 104. The test device 104 implements a method of network testing, which may include passive monitoring, active testing, or a combination of both, as well as testing a sub network, link, or a device. By way of example, the test device 104 may be a transceiver plugged into a network device, which is another device with respect to the transceiver.

The test device 104 may be a protocol-generic test device employed in the communication network 100 for monitoring packets sent across the network 100, such as a packet 103 being communicated in this illustrative example from the source 101 to the destination 102.

While only two devices 101 and 102 are shown as communicatively coupled via the communication network 100 in FIG. 2, it should be understood that any number of devices may be so connected. Further, while the device 101 is indicated as a source and the device 102—as a destination, it will be appreciated that communication may be bi-directional such that in some instances the device 102 is a source and the device 101 is a destination.

The test device (sensor) 104 is connected inline in the network 100 and is capable of inspecting and/or capturing packets which travel from the source 101 to the destination 102, and of examining the received packets. In the example shown in FIG. 2, the packet 103 travels from the source 101 to the destination 102 and is either intercepted and re-transmitted, or simply inspected without disruption by the test device 104.

The test device 104 may examine received packets (or their copies) exemplified by the packet 103 in FIG. 2. The test device 104 may be strictly a measurement device that forwards the packet 103 without changing it, or the test device 104 may be an element of the network connecting 101 and 102 which also simultaneously serves as a measurement device. In the former case, the packet 103 is forwarded to the destination address of the packet without any change to the packet 103. In the latter case, the packet is modified according to how the network element would behave in the absence of the measurement function. In either case, the packet 103 may be copied and forwarded to the monitoring manager 150 as discussed further. The monitoring manager may be a distributed system and may include a packet storage and retrieval system such as schematically shown in FIG. 3, which works on a per flow basis as discussed below.

In order to read a particular packet flow faster than a brute force scan of an entire time range on disk, the method disclosed herein concentrates packets of each flow in some areas of non-volatile memory such as a disk array, whereas other areas of the memory contain no relevant packets. Therefore, the memory contains many segments referred herein as "buckets." Each bucket is associated with a hash key value so that the bucket may contain only packets which have a hash key equal to the hash key associated with the particular bucket. Hash keys are not unique, and many unrelated packets may coincidentally share the same hash key and be stored in the same bucket. It should be understood that the purpose of buckets is to allow a search to avoid reading large fractions of the aggregate packet storage; however, testing individual packets in a matching bucket is still necessary so that packets that coincidentally share the same hash key can be ignored. This way, when reading packets for a given flow from the packet storage, most of the buckets will not be read since the hash keys of those buckets do not match the hash key of the flow index. The buckets that are read will contain some packets that do not belong to the flow and should be ignored. More importantly, the buckets that are read will contain all of the packets that do belong to the flow.

Operating in real time, upon receiving a packet, the packet storage system applies a hash function to values received in the packet so as to determine a storage bucket, and stores the packet in the so defined storage bucket. A hash function maps large data sets of a variable length to smaller data sets of a fixed length; in other words, a practically unlimited number of packet flows may be mapped to a predefined, limited number of storage buckets. A variety of known hash functions may be used, including a simple "AND" function with a bitmask and a complex cryptographic hash function. The algorithm generates a hash key based on one or more fields of a packet; either the hash function is applied to values of these packet fields, or to a flow index calculated based on these packet fields. The fields should be chosen so as to uniquely define a flow. The flow index may be a single number or a set of numbers based on the one or more fields which define the flow. By way of example, a flow may be defined by a pair of source and destination IP addresses and include packets exchanged between the two nodes, and a flow index may be a concatenation of the IP source address and IP destination address of the packet.

Figure 3:
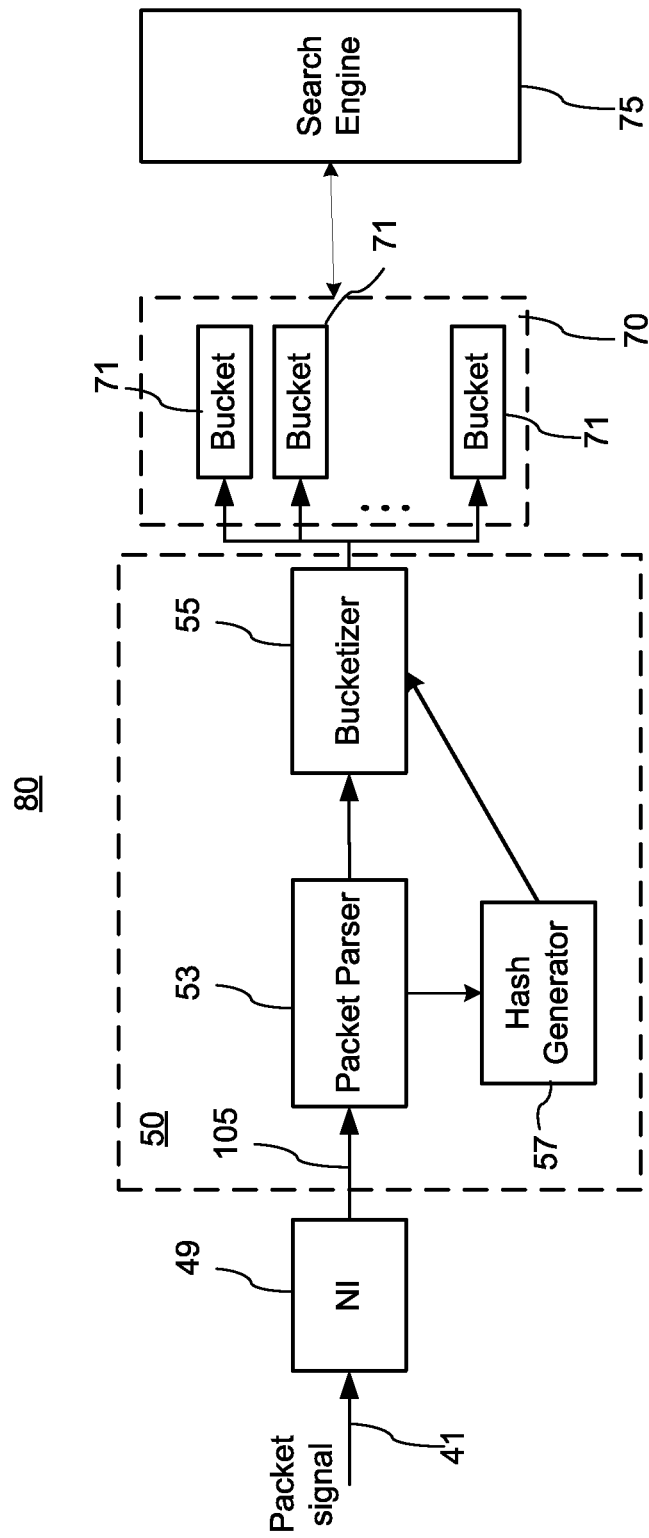
FIG. 3 is a schematic representation of a network device.

FIG. 3 illustrates a network device 80 implementing a packet storage and retrieval method—according to an embodiment of the present invention. The network device 80 may exemplify the test device 104, or may be a different network-connected device, e.g. a general-purpose or specialized computer with software implementing the method, that may be co-located with the test device 104 or may be installed at a different location. As illustrated, the network device 80 includes a network interface (NI) 49 for receiving packets from the network 100, for example via the test device 104, a packet processor 50 for processing and sorting packets according to packet flows and for assigning packet flow descriptors to the packets, and a memory device or devices 70, also referred to herein as the packet store 70, which is coupled to the packet processor 50 and is usable, including readable, by it, for storing the packets in association with their respective packet flow descriptors. The packet processor 50 includes a packet parser (PP) 53 that connects to a hash generator (AHG) 57. A memory interface 55, which is also referred to herein as a packet sorter (or bucketizer) 55 and which connects to the packet store 70, may further be provided within the packet processor 50. In one embodiment the network device 80 further includes a packet search engine (PSE) 75 that is coupled to the memory device 70 and provides packet search capabilities as described hereinbelow. The packet search engine 75 includes a hash generator which employs the same hashing method as the hashing component 57 and may be implemented as using at least some of the computer instructions implementing the 57 component. The packet processor 50 may be implemented in hardware, software, and a combination thereof using one or more hardware processors. The term 'hardware processor' as used herein includes any type of a digital processor including but not limited to an FPGA, an ASIC, a DSP, a microcontroller, or any combination thereof. In one embodiment different functional blocks or logics 53, 55 and 57 of the packet processor 50 are implemented using software or firmware instructions, which are saved in a computer-readable memory and are executable by a hardware processor. In one embodiment, the different functional blocks or logics 53, 55 and 57 of the packet processor 50 are implemented using hardware logic as known in the art, for example in an FPGA and/or an ASIC. The packet store 70 may be implemented using any suitable type of computer-readable memory, including but not limited to magnetic storage devices, optical storage devices, semiconductor storage devices, or any combination thereof.

In operation, the network device 80 receives an input packet signal 41 from the network, or from another network-connected device, and extracts therefrom a sequence or stream of packets 105. Each packet from the packet stream 105 is passed to the packet parser (PP) 53 for extracting therefrom flow-defining parameters, which may be in the form of specific bit sequences, typically found in a packet header. The PP 53 may include a FIFO buffer (not shown) for temporary holding each packet therein while the packet is being processed.

Individual packets of the packet stream 105 may generally be data units generated according to any one of a plurality of network protocols, and may encapsulate data units generated according to other protocols. A packet from the packet stream 105 includes a header and a payload; a packet header contains control information for the packet, including information defining a particular flow to which the packet belongs, such as, but not exclusively, packet source and destination information. A packet header typically includes several fields which contain a number of control parameters such as those related to the payload protocol, the origin and destination of the packet, a sequence number of the packet in a session, and others as known in the art. A packet may encapsulate a data unit of a next protocol layer, which includes its own header. In accordance with an aspect of the present invention, a packet contains one or more parameters that define a particular packet flow of interest to which the packet belongs.

Figure 3A:
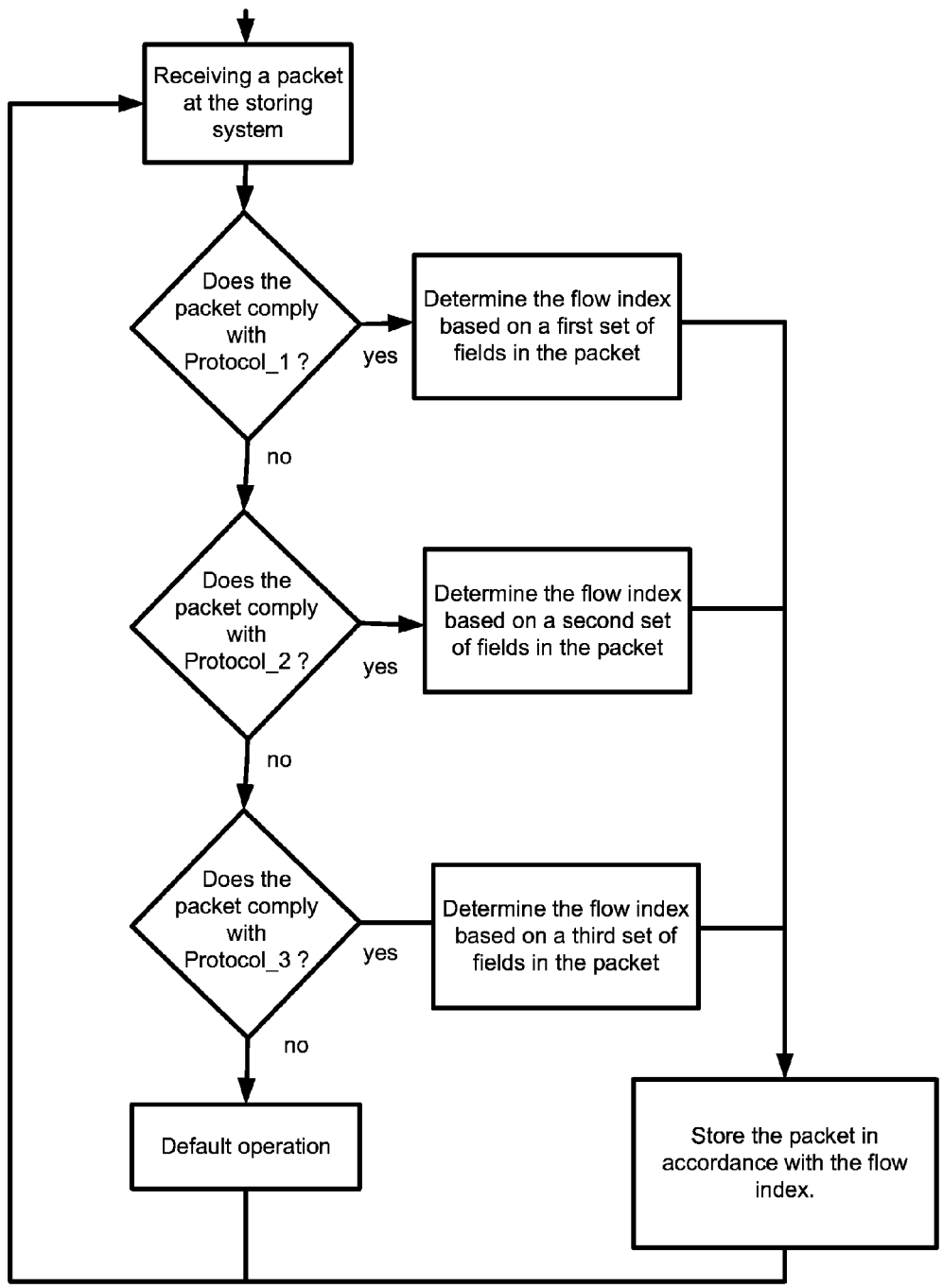
FIG. 3A is a flow chart of a method for defining a packet flow index.

The system may be configured to apply distinct rules for identifying packet flows dependent on the protocol whereto the packet complies. FIG. 3A presents an exemplary flowchart for defining a packet flow index. The method may include determining whether the packet is compliant with a first protocol. If the packet is compliant with the first protocol, a first set of one or more fields is selected as the one or more fields which define the flow. If the packet is not compliant with the first protocol and is compliant with a second protocol, a second set of one or more fields is selected as the one or more fields which define the flow, and so on as configured by the user. By way of example, the flow index may be a function of the IP source and/or destination address(es) present in the packet. In another example, if the packet is compliant with General Packet Radio Service Tunneling Protocol (GTP), a portion of the TEID field may be used to determine the flow index and a storage bucket for storing packets of the flow.

Figure 3B:
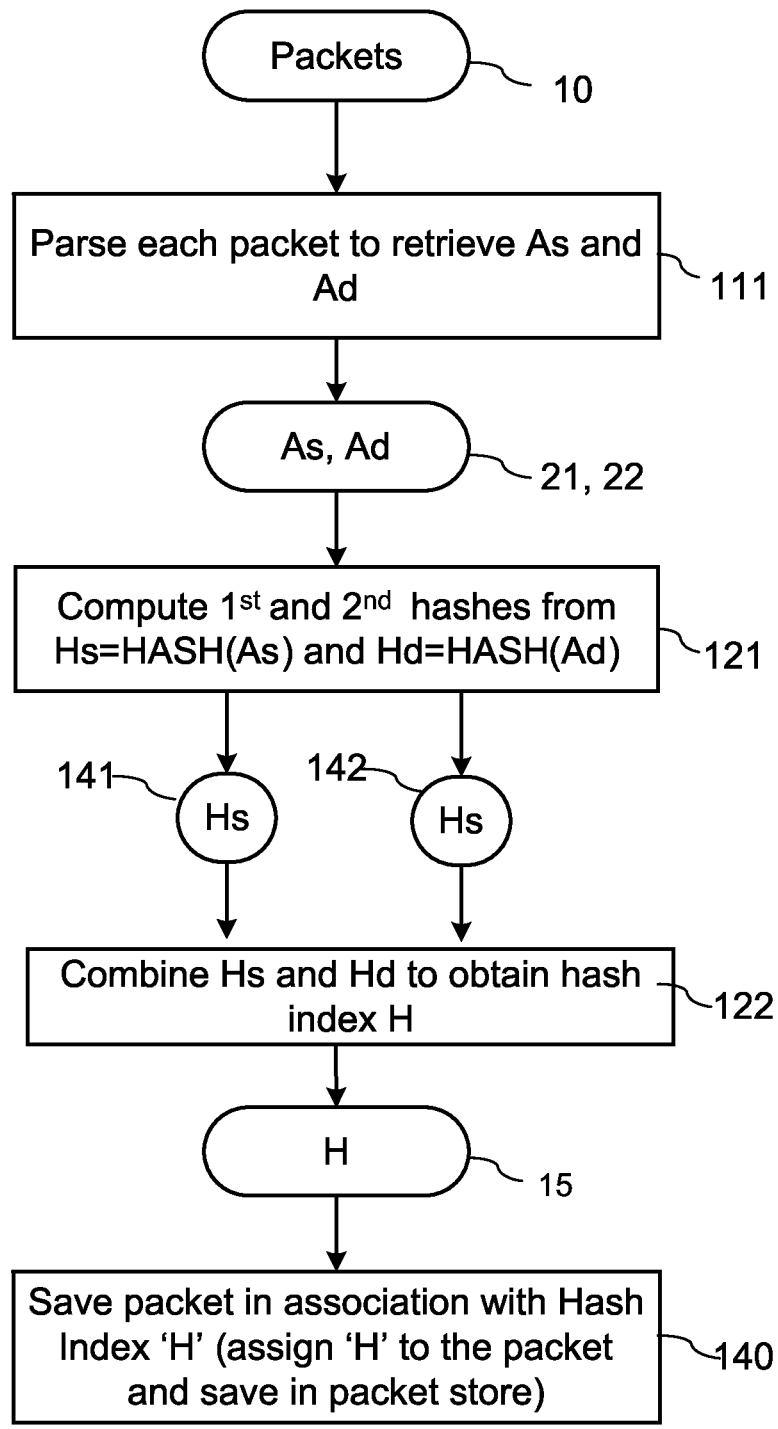
FIG. 3B is a flow chart of an exemplary hashing method.
Figure 3C:
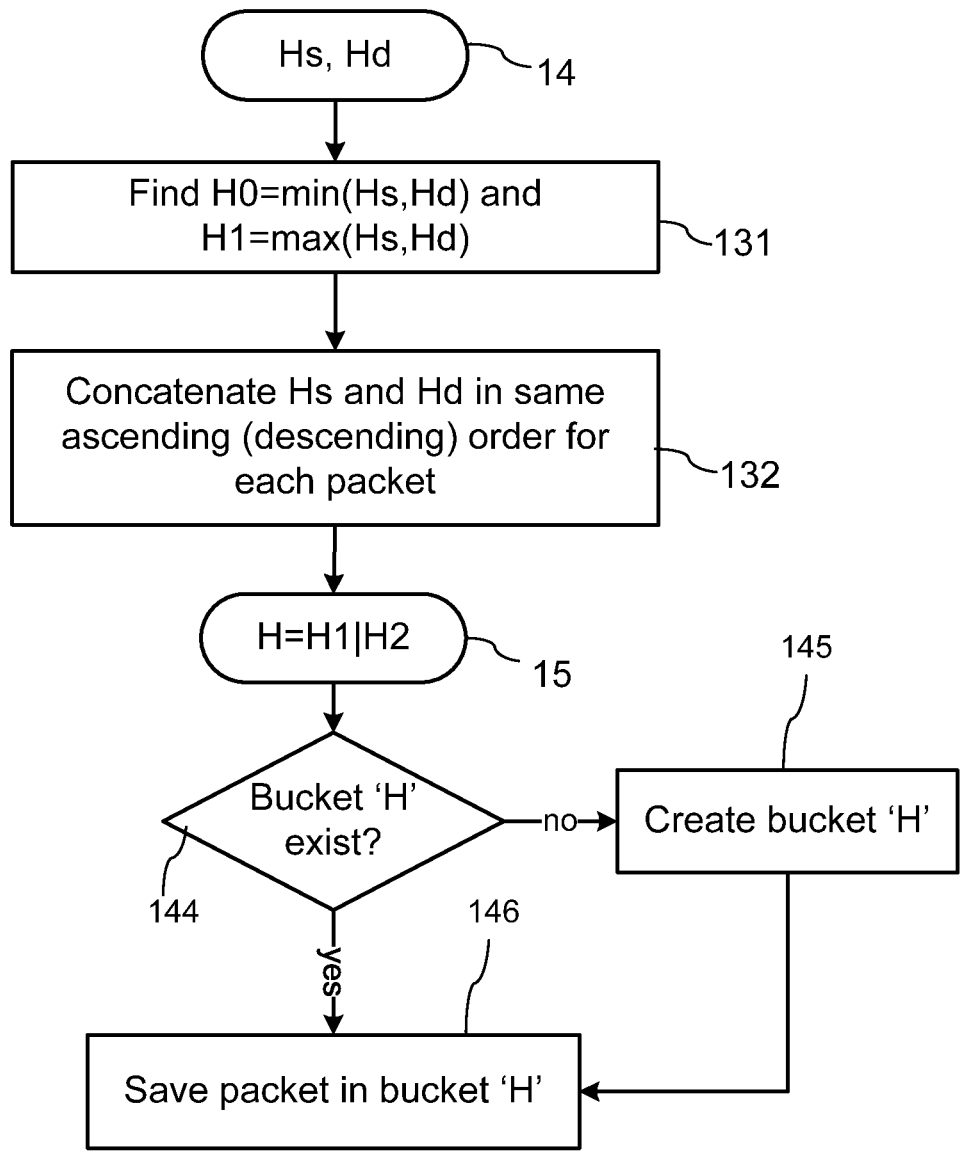
FIG. 3C is a flow chart of a method for combining has indexes.

FIGS. 3B and 3C illustrate a possible hashing mechanism used in one embodiment.

Referring now to FIG. 3B, at step 111 a packet 10 from the packet stream 105 is parsed by the PP 53, which retrieves therefrom the source address As and the destination address Ad 22. The source and destination addresses 21, 22 are then passed to AHG 57 for generating therefrom at step 121 first and second hash numbers Hs 141 and Hd 142, which are also referred to as address hashes or simply as hashes.

In one embodiment, AHG 57 implements a pre-defined HASH( ) function to compute first and second hashes Hs and Hd from the source address As and the destination address Ad, respectively:

$$Hs=\text{HASH}(As) \qquad (1)$$

$$Hd=\text{HASH}(Ad) \qquad (2)$$

Various hash functions HASH( ) that uniquely map flow parameters As and Ad to hash numbers can be used to compute the first and second address hashes Hs and Hd, and one skilled in the art would be able to reference mathematical and computer science journals and other academic research literature to select a suitable hash function based on particular preferences and requirement of a particular application. One hash function option that is generally suitable for this purpose, widely known, and studied in the literature is the Cyclic Redundancy Calculation (CRC). The CRC algorithm is just one example of an algorithm that will satisfy the hash algorithm requirements of this method. Generally, the hash function HASH( ) should be selected so as to map different source and/or destination addresses to different hash numbers, which preferably contain smaller number of bits than the addresses 21, 22. By way of example, the hash function implemented by AHG 57 maps the source and destination addresses As, Ad, which may be 32 or 128 bit long, to 8 bit hashes Hs and Hd. In another embodiment, AHG 57 may implement different hash functions for hashing different flow parameters, such as two different hash functions for the source and destination addresses 21, 22.

The first hash Hs 141 and the second hash Hd 142 are then passed to a combiner, which at step 122 separably combines them to obtain a single hash number H 15 that is referred to herein as the hash index or the flow hash. The term 'separably' as used herein means that any one of the first and second hashes Hs, Hd may be easily restored from the hash index H based on known other of the two hashes, preferably using at most a few simple computations.

At step 140, the packet processor 50 saves the packet 10 in the packet store 70 in association with the hash index H 15 computed for the packet. In one embodiment, the packet store 70 includes a plurality of logically separate memory units 71, which are also referred to herein as memory buckets 71, each associated with a different hash index or a different group of hash indices. Packets 10, after they are parsed by the PP 53 to generate the hash index, are saved by the sorter (bucketizer) 55 into one of the buckets 71 that is associated with the hash index H of the packet. It will be appreciated, however, that there are many ways to individually associate each particular packet stored in memory with a particular hash index H computed therefor so that each packet with a particular hash index could be later retrieved based on its hash index and ip flow parameters. Any of these mappings may be used to implement the packet store 70.

Turning now to FIG. 3C, in one embodiment the step 122 of combining of the first and second hashes Hs, Hd into a single hash index includes concatenating them in either an ascending order of their values for all received packets, or in a descending order of their values for all received packets, so that for all received packets a greater of the first and second hashes Hs, Hd always follows or always precedes a smaller of the first or second hashes:

$$H=[Hs|Hd] \qquad (3a),$$

or $$H=[Hd|Hs] \quad (3b).$$

Here, the notation '[A|B]' means the operation of concatenation of two numbers 'A' and 'B', which means that digits representing B in a particular numeral systems are appended at the end of 'A' represented in the same numeral system.

Accordingly, in one embodiment step 122 includes step 131 wherein it is determined which of the first and second hashes Hs, Hd is smaller (or greater) than the other, and then in step 132 concatenating numerical representation of Hs and Hd in an ascending order of their values for all received packets 10. In another embodiment, step 32 includes concatenating numerical representation of Hs and Hd in a descending order for all received packets 10.

Referring again to FIG. 3C, in one embodiment once the hash index 'H' 15 is computed, at step 144 the packet sorter 55 verifies whether there is a bucket 71 in the packet store 70 which index corresponds to the hash index 15 computed for the packet. If such a bucket exists, the packet is saved into it at step 146. If there is no such bucket in the packet store 70, e.g. packet 10 is the first received packet containing the particular combination of addresses 21, 22 that results in the hash index 15, an empty bucket 71 may be obtained to store the packet. An empty bucket may be: obtained from a list of empty buckets, created by allocating memory to hold a new empty bucket, obtained by writing the contents of another bucket to the storage device immediately, or obtained in any other fashion that provides access to a bucket in a state with no packets stored in it. The empty bucket may then be assigned a bucket index corresponding to the hash index 'H' 15 at step 145, and packet 10 may then be saved into it. In one embodiment, the packet sorter 55 maintains a look-up table with bucket indices of existing buckets 71 in association with memory addresses for the corresponding buckets 71 in packet store 70. In one embodiment there is one to one correspondence of bucket indices with the hash indices created by the packet processor 50 for all received packets, or for packets received during a predefined period of time. In one embodiment, each bucket 71 may be associated with more than one hash index 15, so that it would store packets belonging to a group of packet flows, and the packet sorter 55 implements a pre-defined mapping rule to map each hash index 15 to a particular bucket index in order to determine where to store each received packet 10. By way of example, hash indices H 15 may be 16 bits long each, for a total of 65535 different values, while bucket indices may be 12 bit long, for a maximum of 4096 buckets 71. The mapping from the 16 bit hash indices to the 12 bit bucket indices may be accomplished by calculating the bucket index equal to the hash index modulus 4096.

Once the hash key has been calculated, the packet can be passed to the storage bucket associated with that hash key. Although several flows may be stored in the same bucket, and one flow may be dispersed within several buckets, the method described herein significantly reduces the flow retrieval time.

Preferably, a bucket is created and appended in a volatile memory, e.g. RAM, and is later written into a non-volatile memory, e.g. a hard disk, after the bucket is full or too old. In another embodiment, buckets are created on a hard disk. In operation, there are two pluralities of buckets; the first plurality of complete buckets thereto no more packets are written are stored in a non-volatile memory, the second plurality of incomplete buckets thereto more packets may be added are preferably in a volatile memory, but may be stored in a non-volatile memory. When a non-complete bucket reaches a predefined size in memory or in time, it may be rewritten into the non-volatile memory and marked as complete. The number of distinct bucket hash keys, the size of the buckets, and the maximum time length of the bucket are all tunable parameters.

Once the hash generator 57 (FIG. 3) has determined the bucket's hash index (hash key) as disclosed above with reference to FIGS. 3B and 3C, the packet is sent to the bucketizer 55, which appends the packet to a correct bucket. The bucketizer component 55 also may contain instructions for writing any full or too old buckets to a non-volatile storage such as a disk array, and for preparing a new bucket storage. When buckets are moved or newly created, the bucketizer updates a bucket index file which may contain information on each bucket including those that have been written to the disk array and may be used by a flow reader to find which buckets on the disk array have the hash key corresponding to the flow index of a desired flow. The bucket index file may contain records for each bucket, complete or incomplete, and the timestamp of a first packet in the bucket.

Figure 4:
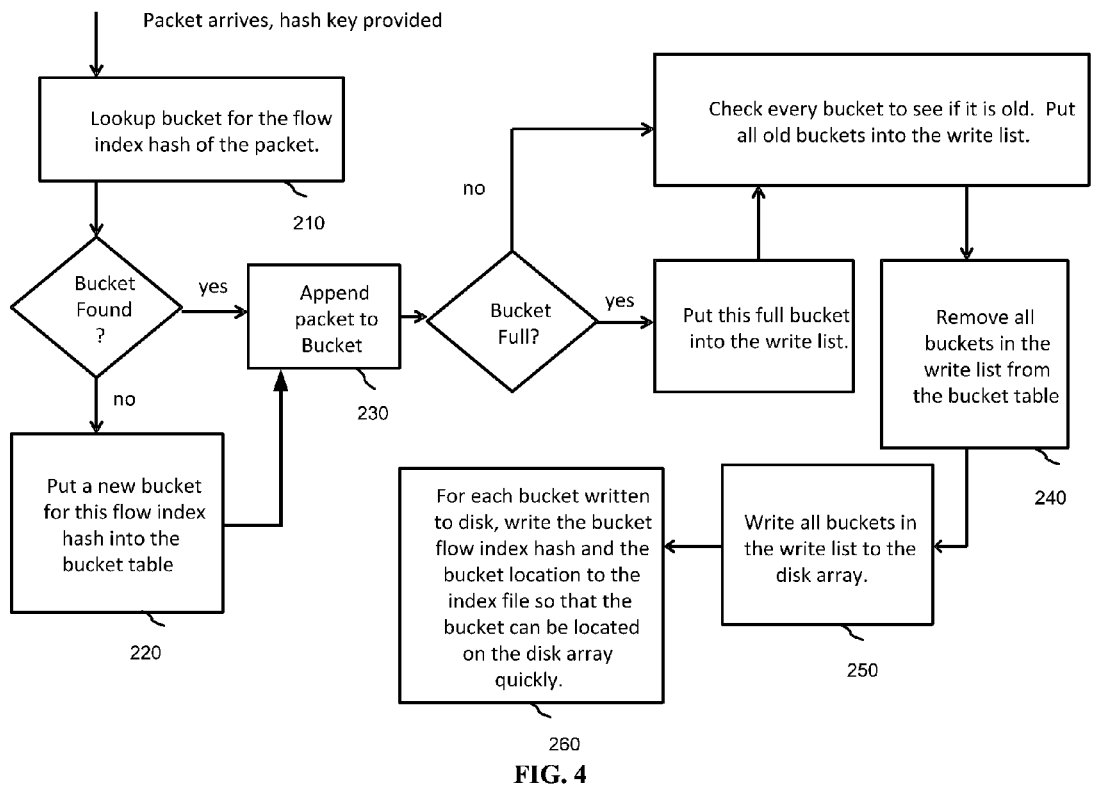
FIG. 4 is a decision diagram.

FIG. 4 provides an exemplary decision diagram which may be followed by the bucketizer 55 upon receiving each packet. When a packet arrives and a hash function provides a hash key based on one or more fields of the packet, the bucketizer checks whether a bucket corresponding to the hash key has already been created (step 210) and has space for additional packets, i.e. the bucket is incomplete. If not so, the bucketizer creates the bucket (step 220); then, the packet is appended to the bucket (step 230). After that, the bucketizer performs maintenance tasks which include writing full or too old buckets onto a disk and updating the bucket records, steps 240-260.

Accordingly, upon receiving a packet and using values of one or more predefined fields of the packet, the bucketizer determines a hash index which uniquely defines the incomplete storage bucket where the packet is to be stored.

The "bucketizer" algorithm works well for quickly storing packets in a way that makes searching the disk for packets with a specific flow index much faster. However, it complicates the process of retrieving flow data because all the packets are not being stored in a strict time ordering. Therefore it is necessary to add a special flow retrieval algorithm which can handle the added complexity of the indexed flow storage.

Preferably, an acquisition timestamp is stored together with the packet on the storage device; it may be stored separately but associated with the packet e.g. though the use of pointers. Additionally, other parameters not directly obtainable from the packet itself may also be stored together with the packet or in a separate file and associated with the packet through the use of pointers. By way of example, since these parameters are not normally encoded directly in the packet, any filter information, flow indexes, the probe ID, and/or ingress port number where the packet was received may be stored along with the packet on the storage device and/or in a separate file and associated with the packet through the use of pointers.

Users expect that sets of packets retrieved for a flow, or for a certain time range, will contain all packets of flow or time range. If a packet storage algorithm places all packets on the disk array in a strict time order, it is easy to recover all packets in a given time range. However, the storing method described herein results in the presence of "old" buckets where the first packet timestamp is more than some time, T, in the past. These old ("complete") buckets get written to the disk even if they are not completely full. For example, the bucketizer may be configured to time out buckets where the first packet timestamp is more than 1 minute in the past. Therefore buckets can be out of order by as much as time T (for example, out of order by as much as a minute if T=60 seconds), so it is useful to provide a special flow retrieval algorithm to retrieve packets from the storage.

The end result of the Flow Storage algorithm described above is that the individual packets within bucket i will not necessarily have earlier timestamps than the individual packets within bucket i+1. Any given packet in bucket i may have a timestamp that is later than a given packet in bucket i+1 by as much as time T. Let Ts(i) be the first packet timestamp of the i-th bucket number stored to the disk. Then the Flow Storage algorithm described above, taking T=60, will result in the following two conditions: Ts(i)<Ts(i+1)+60, and Ts(i)>Ts(i−1)−60. Therefore, assuming these two conditions hold, it is possible to retrieve all the packets for a given time range without searching the entire storage device.

Let us consider the case when a user requests all the data for a certain time range, from start time Ts to end time Te. If the packets were stored in strict time order, the retrieval component would search the bucket index file for the first index, Is, such that T(Is)>=Ts. Then the retrieval component would search for the last index, Ie, such that T(Ie)<=Te. Then the retrieval component would compare all of the packets starting at index Is and ending at index Ie. However, if the buckets can be out of sequence by as much as time T, the system has to expand the set of bucket indexes that are examined. In fact, if the buckets are out of order by as much as time T, the retrieval component has to search for the first index T(Is)>=Ts−T, and search for the last index T(Ie)<=Te+T. Then, in addition, whenever an individual packet timestamp, Tp, is outside the strict time search interval, i.e. Tp<Ts or Tp>Te, the retrieval component must not include that packet in the data returned to the user.

Figure 5:
FIG. 5 is a diagram illustrating the functionality of the retrieval component.
Figure 5:

FIG. 5 is a diagram illustrating the functionality of the retrieval component also referred herein as the search engine 75. Each bucket is represented by a box. The timestamp Ts(i) for the bucket i is the timestamp of the first packet in the bucket i. For strict time ordering: Ts(i−1)<=Ts(i)<=Ts(i+1); the first bucket to search is where Ts(Is)>=Ts; the last bucket to search is where Ts(Ie)<=Te. For loose time ordering: Ts(i−1)−T<=Ts(i)<=Ts(i+1)+T, where T is the limit of number of the buckets may be out of order. For illustrative purposes, the time interval is set to T=60. For loose time ordering where T=60, Ts(i−1)−60<=Ts(i)<=Ts(i+1)+60. The first bucket to search is where Ts(Is)>=Ts−60. The last bucket to search is where Ts(Ie)<=Te+60. For the loose time ordering search, each individual packet that is examined is ignored if the individual packet timestamp is less than Ts or greater than Te. However, the system has to search all of the buckets in the wider range, and look at all of the timestamps in the loose time range so that no packets are missing from the final result set. This way, even a disk full of partially out of order buckets can be efficiently searched, and all the data for a specific flow can be efficiently compiled.

This algorithm is much more efficient than the strict time ordering, because a bucket only has to be read from the disk if several conditions are met: 1) the earliest packet time in the bucket is equal to or later than the start time of the search; 2) the latest packet time in the bucket is equal to or earlier than the end time of the search; and 3) the bucket matches with the flow index hash of the flow being retrieved from the data store. A strictly time ordered data set that is not indexed by flow would also require the conditions #1 and #2. However, this algorithm can avoid reading large amounts of extraneous information by ruling out buckets that fail condition #3. This speeds up retrieving flow data tremendously, and makes it practical to quickly analyze specific flows in a large data set and on a fast network with a lot of traffic.

Figure 6:
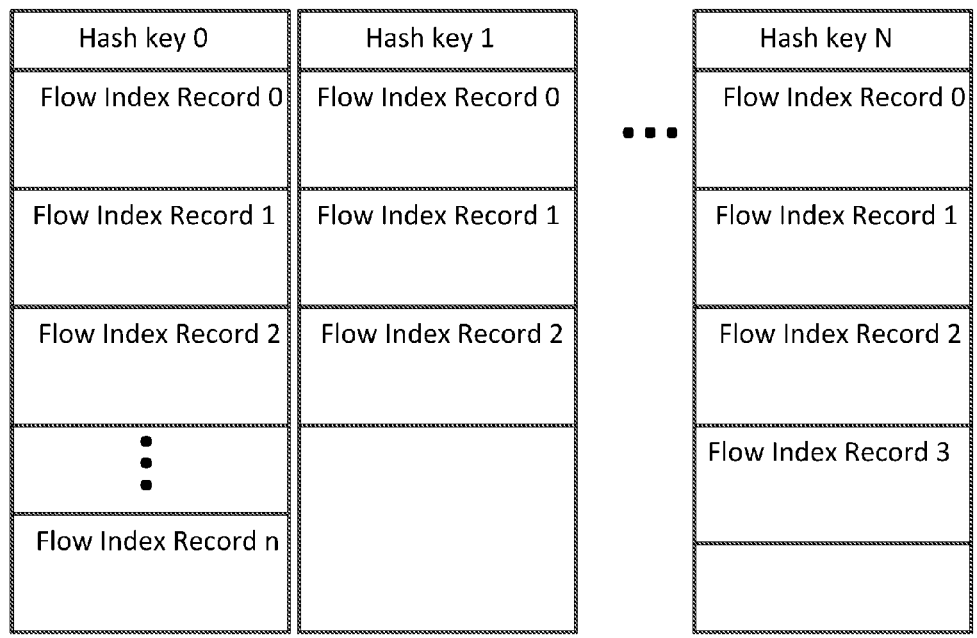
FIG. 6 is a is a schematic diagram of bucket records.

As described above, the bucket records maintained on per bucket basis, each includes a plurality of flow indexes as shown in FIG. 6; accordingly several bucket records may have a same flow index indicating that packets of a particular flow are stored in several bucket created consecutively. In this case, a search for a particular flow requires accessing all the buckets associated with the hash key calculating the flow index or, which provides a same result, hashing the predefined values of the predefined one or more packet fields which are pre-selected to define the flow. When a particular flow is requested, its hash key value is calculated, and the bucket records which correspond to the particular hash key are searched whether they include a particular flow index which may be in the form of a single number or several numbers defined from (including being copied from) one or more fields from packets which belong to a particular flow which, in turn, is defined as a plurality of packets having same values in a pre-selected one or more fields of a packet. There is no need to examine the entire plurality of flow records. After the buckets which contain the particular flow are identified, the packets stored therein are individually evaluated whether they belong to the flow of interest.

The search and retrieval system 75 uses the same hashing mechanism as described above with reference to the hashing component 57 (FIG. 3) and FIGS. 3B and 3C.

By way of example, the system may be configured to identify a particular network flow 'X' which includes all packets between a first selected network address 'X1' and a second selected network address 'X2' by performing the following sequence of operations.

First, the hash index (or "key") 'Hf' for the selected packet flow is computed as described hereinabove with reference to FIG. 3B (steps 121, 122) and/or FIG. 3C (steps 131, 132), using any one of the first and second addresses X1, X2, for example X1, as the source address, and the other of the first and second addresses X1, X2, for example X2, as the destination address. In one embodiment this may include performing operations or computations that may be described by the following equations (4) to (6a) or (6b):

$$Hs = HASH(X1), \qquad (4)$$

$$Hd = HASH(X2), \qquad (5)$$

$$Hf = [\text{MIN}(Hs, Hd) | \text{MAX}(Hs, Hd)] \qquad (6a)$$

or $$Hf = [\text{MAX}(Hs, Hd) | \text{MIN}(Hs, Hd)], \qquad (6b)$$

where formula (6a) is used when the step of computing the hash index for received packets 10 includes concatenating the address hashes in the ascending order of their values, and formula (6b) is used when the step of computing the hash index for received packets includes concatenating the address hashes in the descending order of their values.

Once the hash index Hf for the selected flow is computed, the search engine 75 searches for all packets in the memory store 70 that are associated with the computed flow hash index Hf, which in one embodiment may include identifying which one of the memory buckets 71 is associated with the flow hash index Hf The system may also identify all packets that belong to all network flows 'X' terminating at a particular network address 'X1', that is all packets containing the network address 'X1' as either the source address or the destination address. Here the process of packet searching based on a single address may slightly differ depending on whether the process of FIG. 3C of hashing of received packets included concatenating the first and second hashes Hs, Hd in the ascending or descending order of their values.

In the embodiment wherein the process of FIG. 3C of hashing of received packets the first and second hashes Hs, Hd were concatenated in the ascending order of their values, the lesser of the first and second hashes Hs, Hd is stored in the most significant bits of the hash index and the greater of the two hashes is stored in the least significant digits of the hash index. In this embodiment, SE 75 may use the following process to identify all packets in the packet store 70 that have the selected network address X1 as either the source address or the destination address:

applying the hash function to the selected network address to obtain an address hash Ha=HASH(X1); here, the address hash Ha is represented in the same numeral system that was used in the hashing of received packets 10, and is n digits long; and, searching for all buckets 71 that satisfies either one of the following criteria:

i) the n most significant digits of the hash index of the bucket form the address hash Ha while the remaining least significant digits at the end of the hash index form a number that is equal or greater than the address hash, or ii) the n least significant digits of the hash index of the bucket form the address hash Ha, while the remaining most significant digits of the hash index form a number that is equal or smaller than the address hash.

Mathematically, this can be described as searching for all hash indices H assigned to the buckets 71 that satisfy the following equation (7):

$$H=\text{Union}\{[\text{HASH}(Ha)|Z1],[Z2|\text{HASH}(Ha)]\}, \qquad (7)$$

where Z2 is any n-bit number less than or equal to Ha, Z1 is any n-bit bit number greater than or equal to Ha, and the notation 'Union(A,B)' means the union of sets 'A' and 'B'.

In the embodiment wherein the process of FIG. 3C of hashing of received packets the first and second hashes Hs, Hd were concatenated in the descending order of their values, the greater of the first and second hashes Hs, Hd is stored in the most significant bits of the hash index and the lesser of the two hashes is stored in the least significant digits of the hash index. In this embodiment, SE 75 may use the following process to identify all packets in the packet store 70 that have the selected network address X1 as either the source address or the destination address:

applying the hash function HASH( ) to the selected network address to obtain an address hash Ha=HASH(X1) that is represented in the same numeral system that was used in the hashing of received packets 10, and is n digits long; and, searching for all buckets 71 that satisfies either one of the following criteria:

i) the n most significant digits of the hash index of the bucket form the address hash Ha while the remaining least significant digits at the end of the hash index form a number that is equal or smaller than the address hash, or ii) the n least significant digits of the hash index of the bucket form the address hash Ha, while the remaining most significant digits of the hash index form a number that is equal or greater than the address hash.

Mathematically, this can be described as searching for all hash indices H assigned to the buckets 71 that satisfy the following equation (7):

$$H=\text{Union}\{[\text{HASH}(Ha)|Z2],[Z1|\text{HASH}(Ha)]\}, \qquad (8)$$

Where again Z2 is any n-bit number less than or equal to Ha, and Z1 is any n-bit bit number greater than or equal to Ha.

Advantageously, the aforedescribed process considerably reduces the number of hash indices that needs to be examined in the single-address search, more than 100 times in this particular example.

For easy retrieval of packet on per-flow basis, the system preferably maintains flow records, one record for each particular flow. A flow record includes information for uniquely identifying a flow, possibly a unique flow index. The flow record may include information where the flow is stored; alternatively, the system may have a mechanism for determining the storage bucket(s) based on the flow index. Furthermore, the flow record may contain the status of the flow, e.g. indicate that the flow has been terminated. The system may create a flow record when, e.g., a first packet of the flow is received.

In order to define the status of the flow, the following method algorithm may be employed. Advantageously, the method disclosed herein does not require a complex and computationally expensive state machine that follows the state of each protocol for each flow received from the network. The method also does not require maintaining a list of packets that belong to a particular flow. The system aggregates flow information from the packets, but does not keep track of the full protocol state. Instead, for each protocol, packets may be divided into four types: 1) Flow setup packets, which mark the beginning of a new flow; 2) Flow modification packets, which will modify or alter a flow; 3) Flow content packets, which are packets that belong to the flow, but do not alter the flow; and 4) Flow terminate packets, which mark the end of a flow.

By way of example, the GTP v2 normally operates on top of UDP which is a connectionless protocol and cannot define flow initiation or termination; the connections of the GTPv2, as well the flow initiation and termination, are all handled within the GTPv2 protocol.

GTPv2 Header format: GTPv2 packets are identified by the Message Type field of the GTPv2 header. The first byte of the GTPv2 header is also the first byte of the UDP payload. The general format of this header and is defined in section 5.1 of ETSI TS 129 274 V9.4.0. The second octet of the header is the Message Type. Another very important field of the GTPv2 payload is the TEID. The TEID is normally found in octets 5-8 of the GTPv2 protocol header, and is a 32 bit unsigned number generated by the network elements of the telecom provider.

A GTPv2 Flow setup packet is detected by referencing the Message Type field of the GTPv2 header. If the Message Type is 32, then the packet is a Create Session Request. Once the product recognizes that the packet is a Create Session Request, it will set up a new flow index to track the overall session (if one does not exist already). In addition, it is also normal for the Create Session Request to define several sub-sessions within this first packet of the flow. Each sub-session is also a flow indexed by the sub-session identifiers. Therefore, multiple flows will be defined simultaneously by the flow setup packet. For example, a new flow setup packet may define all of the following flows: 1) The control plane overall session flow. This flow implicitly contains all the packets of all the sub-flows defined by the flow setup packet, and also all the packets at the control plane layer which alter the sub-flows. 2) (optional) Sub-flow for bearer ID 5. This sub-flow will transport all of the user's emails. 3) (optional) Sub-flow for bearer ID 6. This sub-flow will transport all of the user's internet traffic.

A GTPv2 Flow modification packet is detected by referencing the Message Type field of the GTPv2 header. If the Message Type is 97, then the packet is an Update Bearer Request. The Update Bearer Request message will, for example, cause Packet Insight to do the following: 1) Reference an existing control plane overall session flow via the TEID to find the flow index. This packet will be given the overall session flow index. 2) Remove a sub-flow for bearer ID 5. 3) Add a sub-flow for bearer ID 5.

A GTPv2 Flow content packet is detected by the UDP port number, because the content packets are carried on a separate UDP port number. The GTPv2 Flow content packet has a TEID number which can be used to look up the flow indexes at any time. In this GTPv2 example, the GTPv2 Flow TEID number might be used to find the following flow indexes: 1) Find the sub-flow index for bearer ID 6. This might be internet traffic. 2) Find the control plane overall session flow which also contains the sub-flow found in step 1.

A GTPv2 Flow termination packet is detected by referencing the Message Type field of the GTPv2 header. If the Message Type is 37, then the packet is a Delete Session Response. The Delete Session Response message will, for example, cause Packet Insight to do the following: 1) Terminate sub-flow for bearer ID 6. This might indicate that the user's internet connection is terminated. 2) Terminate sub-flow for bearer ID 5. This might indicate that the user's email connection is terminated. 3) The control plane overall session flow is terminated. This might indicate that the user will have to re-negotiate all connections before continuing to use services.

Figure 7:
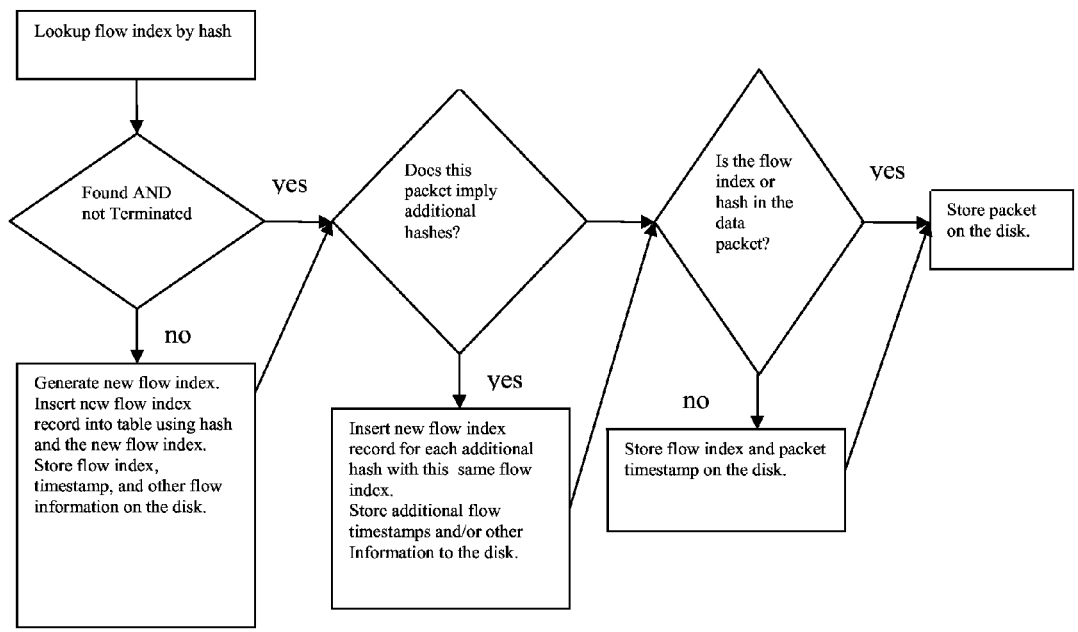
FIGS. 7 through 10 are flow charts of decision trees for different packet types.
Figure 8:
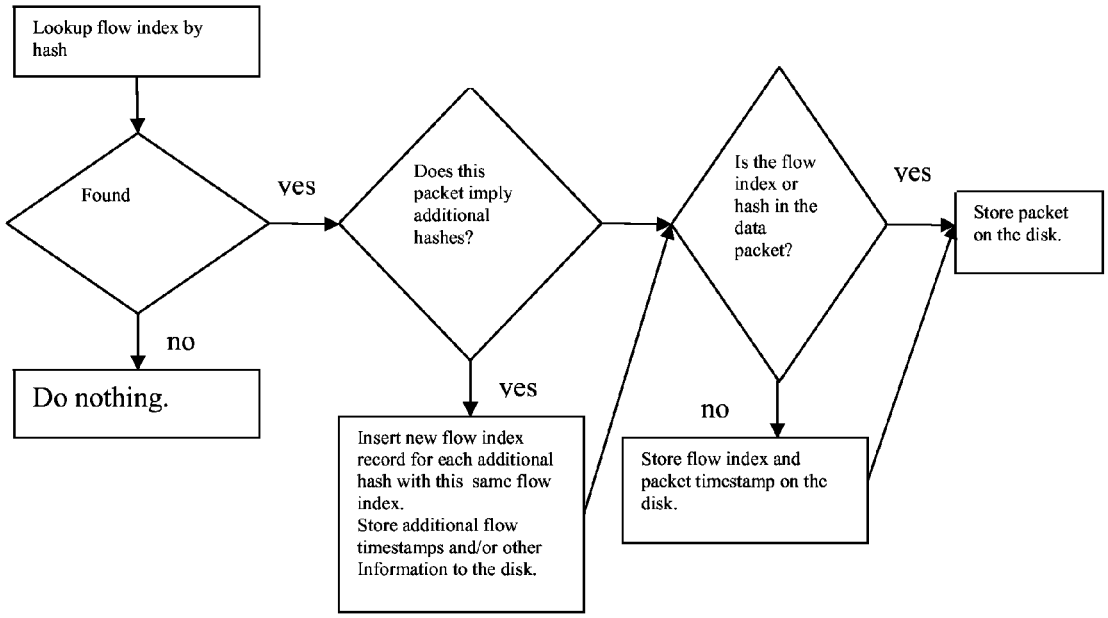
Figure 9:
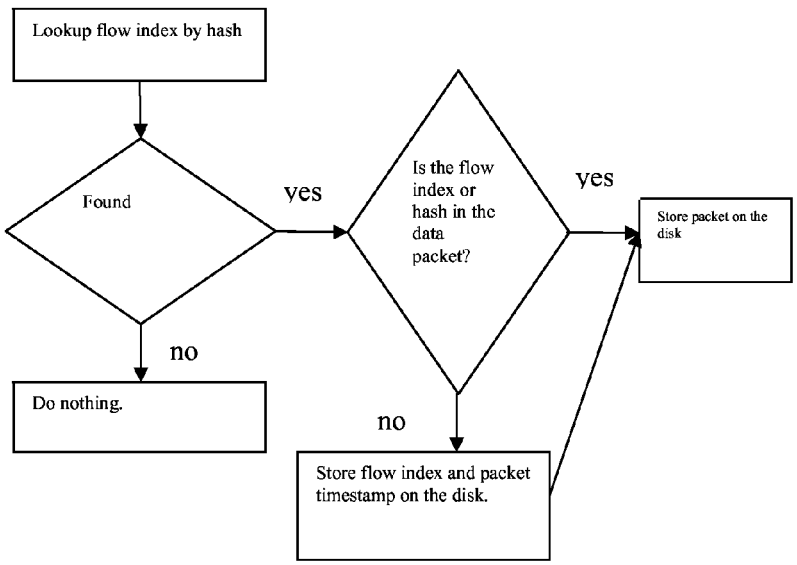
Figure 10:
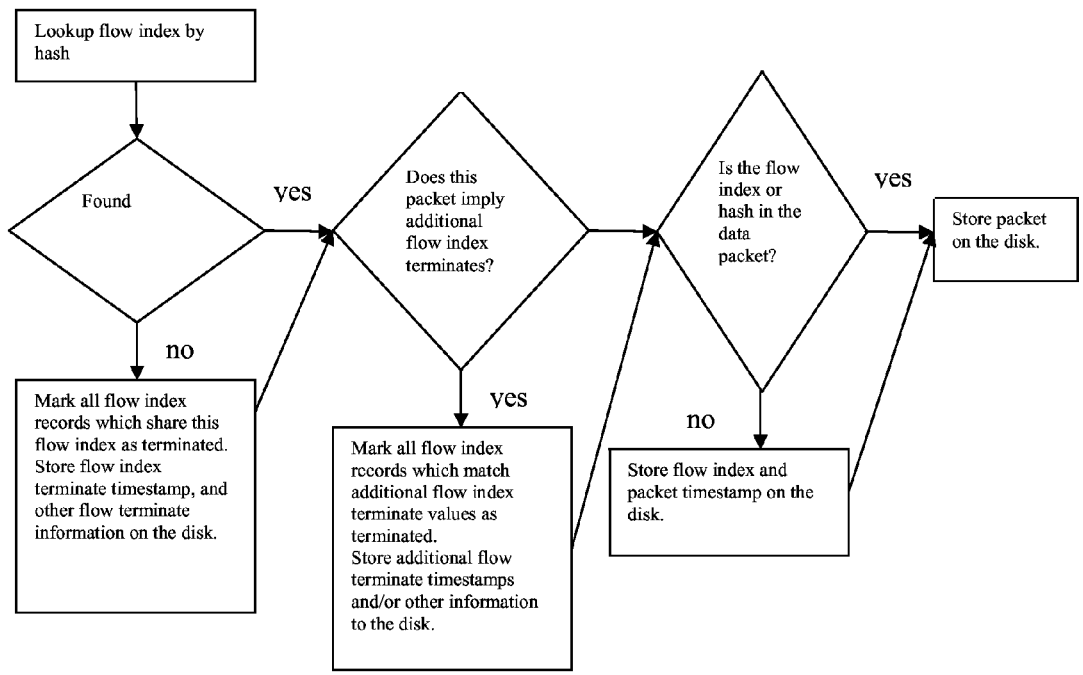

Once a packet has been categorized by type, the method follows a specific decision tree for that packet type. FIGS. 7 through 10 illustrate decision trees for each packet type: FIG. 7 represents a flow setup packet decision tree, FIG. 8 shows a flow modification packet decision tree, FIG. 9—a flow content packet decision tree, and FIG. 10—a flow termination packet decision tree. The "Found and not terminated" test in the first decision tree is especially important, and must be understood in the following manner: the "not terminated" clause is a refinement of what "Found" means. First, the algorithm tries to find the flow index hash in the table. If it is not found, the decision should simply go to no. Next, if it is found, there is a special case where the flow has already been terminated, but has not yet been removed from the table. Flows may be terminated, but not removed from the table, in order to properly handle any out-of-order packets that occur after termination. This case where the flow has been terminated but not removed from the table means the flow record is not available for use in the FIG. 7 decision tree. For the purpose of this decision diagram in FIG. 7, if the flow is terminated, it is equivalent to the case where the flow is NOT found. Therefore, in addition to being "Found", it must be "not Terminated" to pass the test.

There is a common element to all of the decision trees—looking up the flow index record. It is critical that this lookup be efficient. Flow index record lookups may be done as follows:

1) Compute the flow index record hash. This is used to index the Hash Id Bucket number. For example, the first few digits of the GTPv2 TEID might be used as the hash key to locate the Hash Id Bucket Number.

2) Find the Hash Id Bucket in a flow index record table which contains the flow index records which all share the same hash as computed in step 1.

3) Compare each flow index record in the bucket. A lookup match is found if all of the flow compare equal values match exactly with the packet values. If none of the flow index records match all the packet values, then the flow index record lookup fails to find a record.

The system may be configured so that a packet belongs to several flows, one flow being part of another. By way of example, all TCP packets between two nodes and all UDP packets between the same two nodes may be two separate flows within an encapsulating flow which includes all IP packets between the two nodes. Therefore, the system may be configured to perform additional hashes so as to define additional flows to which the packet belongs. Additional flow information may be stored to disk, but does not require storing the packet. The additional flow information may be stored by 1) storing additional flow index and packet timestamp pairs, or 2) storing additional flow index and original flow index pairs. For case 1, retrieval of packets for the additional flow index can be done by looking for packets using their exact timestamp. For case 2, retrieval of packets for the additional flow index can be done by retrieving packets for the original flow index. The "Control Plane" flow described below is a good example of case 1. The "Call Trace" flow described below is a good example of case 2.

For some protocols and flows, there are important connections between flows. Many protocols have special types of flows that contain information about other flows; we refer to such flows as a "Control Plane" or CP flow. Flows that are not CP flows also have a designation, and these are called "User Plane" or UP flows. We can therefore define a second tier meta-flow, that is a "flow of flows", which we refer to as a "Call Trace." The Call Trace meta-flow contains all of the CP flows that are logically connected, and all of the UP flows that the CP flows define and/or reference. The system may use this two tier scheme to index network packets by flow index, and by call trace index also where this applies. For example, in the case of Mobile LTE networks, the call trace (flow of flows) index can be discovered by following the CP flows of the GTP protocol. The GTP signaling provides information about call setup/termination, user equipment attributes (IMSI, IMEI, MSISD, etc), and the flows (GTP tunnels) related to the call. In the flow packet decision trees shown in FIGS. 7 through 10, the references to storing flow index information and/or timestamps to the disk, this is understood as including any and/or all of CP flows, UP flows, and Call Trace flows. The distinction between the kinds of flows that the device handles is important because at a higher level it is normal and useful for the user to retrieve Call Trace flows which are made up of many CP and UP flows. The system is efficient at handling Call Trace flows in addition to lower level flows because it use the same Flow Indexing, Flow Storage, and Flow Retrieval algorithms for handling all flows including Call Trace flows.

The method of storing packetized data as discussed above may be used for storing packets obtained by monitoring a network traffic. The method can efficiently follow flows and store flow information to a disk at high rates, i.e. 10 Gbps or higher, which is necessary for a device that can report flow information and efficiently recover flow packets. In another embodiment, the method may be used for storing media streams such as movies e.g. at an intermediate node therethrough multiple streams are transported; the media streams may be stored for quality control and billing purposes.

According to the method, each packet is stored in the packet store so that the system can efficiently read out only the packets that belong to a given flow of interest. In essence, the packets are stored by flow and, loosely, by time.

Advantageously, examining the bucket records or the flow records without analyzing stored packets themselves may answer the question whether a particular flow is present in the storage or absent therefrom.

When implemented in software, the functions in accordance with this invention may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Note that in all cases, whenever storage to the "disk" is mentioned, the "disk" may be whatever storage medium is most convenient for the task, such as RAM memory, raw disk array partitions, flat files, specially indexed files, and/or relational databases.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In the description above, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

We claim:

1. A method for storing and retrieving a packet flow, the method comprising:
   receiving a packet from a network;
   hashing values of one or more fields in the received packet so as to select a storage bucket from a plurality of buckets;
   storing the packet in the selected storage bucket, wherein a bucket record associated with the selected storage bucket includes a flow index determined based on the values of the one or more fields in the packet;
   obtaining values of one or more parameters;
   selecting a retrieval bucket from the plurality of buckets by hashing the values of the one or more parameters;
   determining whether a bucket record associated with the retrieval bucket contains a flow index associated with the values of the one or more parameters; and
   if the bucket record associated with the retrieval bucket contains a flow index associated with the values of the one or more parameters, retrieving at least a portion of the packet flow from the retrieval bucket;
wherein the retrieval bucket is one of a plurality of retrieval buckets selected by hashing the values of the one or more parameters, and the packet flow is retrieved from the plurality of retrieval buckets ordered by time.

2. A method as defined in claim 1, further comprising determining if the packet is a flow setup packet and, if the packet is a flow setup packet, creating a flow record using the values in the one or more fields of the packet, wherein the flow record is associated with the storage bucket.

3. The method as defined in claim 2, wherein the flow record associated with the values in the one or more fields of the packet includes time when the packet was captured.

4. The method as defined in claim 1, wherein the flow index is included into the flow record.

5. The method as defined in claim 1, wherein the storage bucket is created in a non-volatile memory or written to the non-volatile memory when the storage bucket is full or timed out.

6. A non-transitory computer-readable medium which includes computer program instructions that cause a computer system to execute the method defined in claim 1.

* * * * *